Aug. 23, 1960 — E. A. ADAMSON — 2,950,135
OIL SEAL
Filed Sept. 7, 1956 — 3 Sheets-Sheet 1
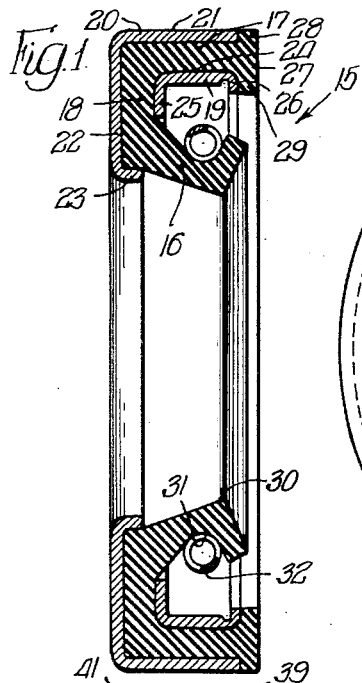
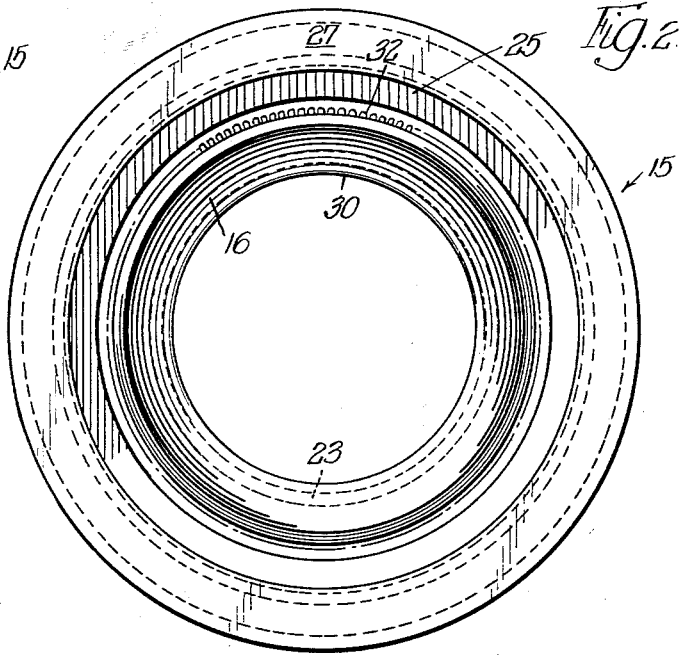
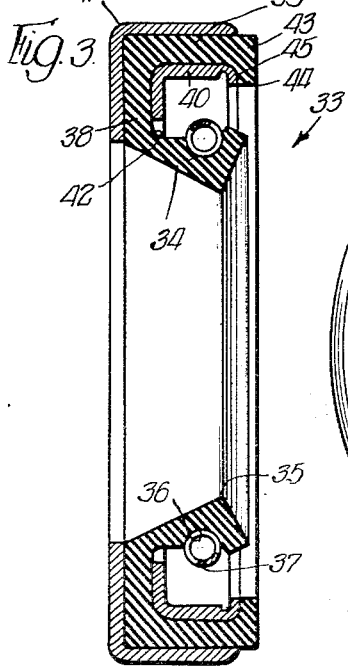
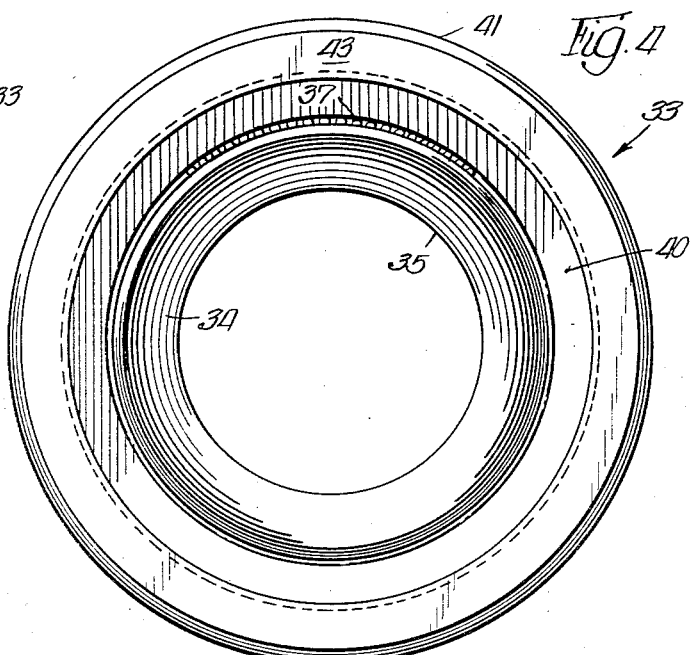
INVENTOR.
Elmer A. Adamson,
BY
Cromwell, Greist & Warden
Atty.

Aug. 23, 1960 E. A. ADAMSON 2,950,135
OIL SEAL

Filed Sept. 7, 1956 3 Sheets-Sheet 2

INVENTOR.
Elmer A. Adamson,
BY
Cromwell, Greist + Warden
Attys

Aug. 23, 1960   E. A. ADAMSON   2,950,135
OIL SEAL
Filed Sept. 7, 1956   3 Sheets-Sheet 3
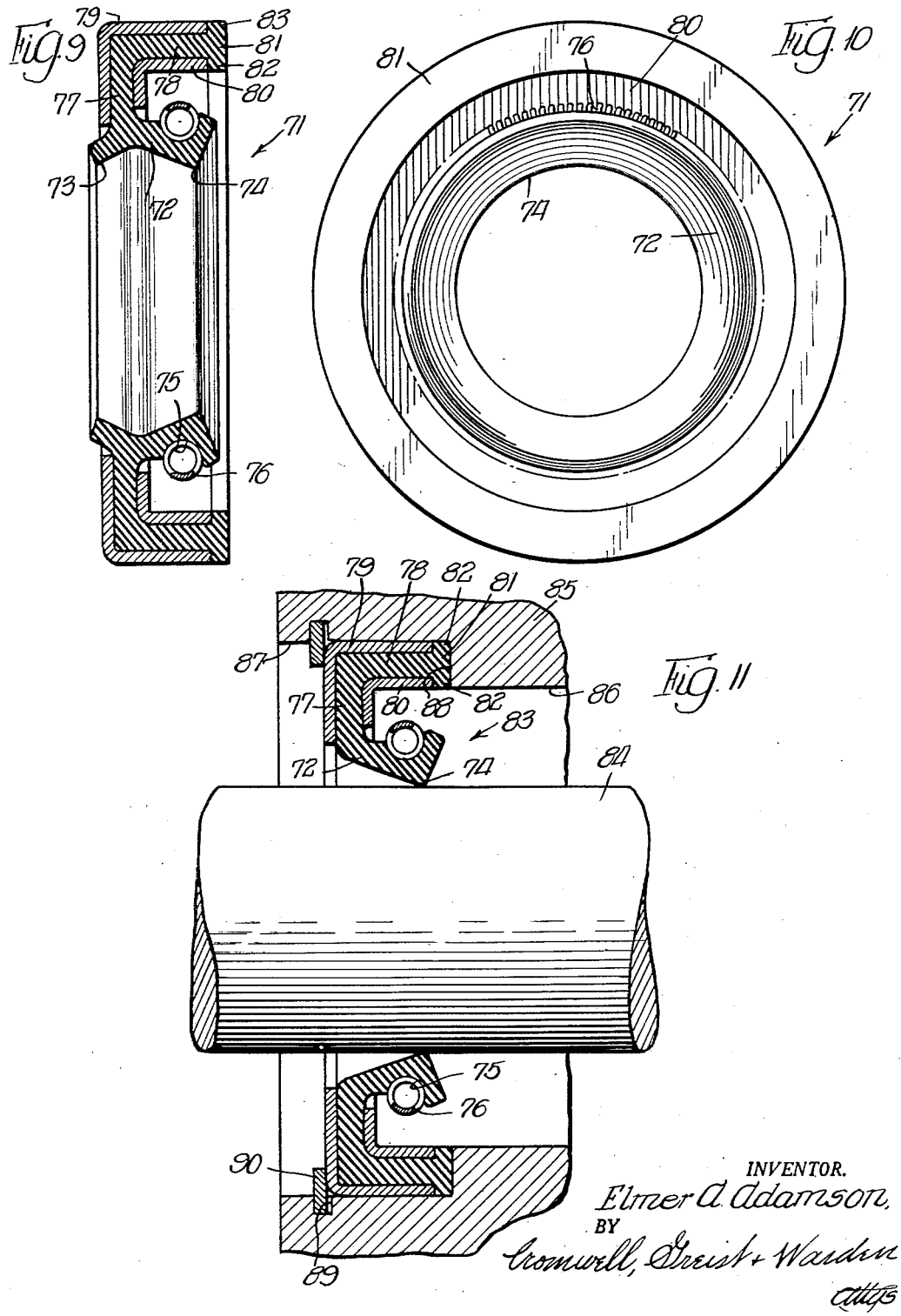
INVENTOR.
Elmer A. Adamson,
BY
Cromwell, Greist & Warden
ATTYS

United States Patent Office 2,950,135
Patented Aug. 23, 1960

2,950,135

OIL SEAL

Elmer A. Adamson, Chicago, Ill., assignor to Chicago Rawhide Manufacturing Company, Chicago, Ill., a corporation of Illinois Filed Sept. 7, 1956, Ser. No. 608,513

3 Claims. (Cl. 288—3)

The present invention relates generally to a new and improved form of oil seal adapted for mounting in sealing engagement with a shaft, the oil seal being provided with an annular flexible sealing lip portion integrally joined with an annular body portion which is held between spaced ring-like shell members, a free end of the body portion extending outwardly of adjacent ends of the ring-like shell members to provide the radially acting oil seal with an end face sealing gasket for sealing engagement with a radially directed surface associated with a shaft on which the improved oil seal is mounted.

It is an object of the present invention to provide an improved form of radially acting oil seal which is provided with an end face sealing gasket, the oil seal being of uncomplicated design and construction and capable of providing efficient radial and end face sealing action.

Another object is to provide an improved form of radially acting annular oil seal adapted for mounting in sealing engagement with a rotatable shaft, the oil seal being provided with a flexible annular sealing lip portion integrally joined with an outwardly positioned annular body portion, which body portion is clamped in bonded or non-bonded relation between concentric ring-like shell members, a free circumferentially continuous end of the body portion protruding in an axial direction outwardly of adjacent end surfaces of the ring-like shell members to provide an end face sealing gasket formed integral with the body portion of the oil seal and capable of cooperatively acting with the radially acting sealing lip portion to sealingly engage a radially directed surface associated with the shaft under seal.

A further object is to provide an oil seal of the type previously described wherein the end face sealing gasket is provided with at least one radially directed flange portion which overlaps an annular edge portion of a ring-like shell member thereby allowing the shell member to back-up or axially reinforce the flange portion to provide an efficiently acting end face seal.

Other objects not specifically set forth will become apparent from the following detailed description made in conjunction with the drawings wherein:

Fig. 1 is a vertical section of one form of oil seal incorporating the principles of the present invention;

Fig. 2 is an end elevation of the seal of Fig. 1;

Fig. 3 is a vertical section of another form of oil seal provided with the end face sealing feature of the present invention;

Fig. 4 is an end elevation of the seal of Fig. 3;

Fig. 9 is a vertical section of still another form of improved oil seal;

Fig. 10 is an end elevation of the seal of Fig. 9; and

Fig. 11 is a fragmentary and partially sectioned assembly illustrating another form of improved oil seal mounted in its operative position relative to a shaft within a shaft housing.

Figure 5:
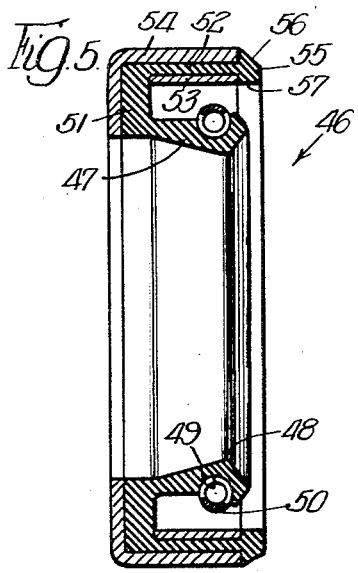
Fig. 5 is a vertical section of still another form of oil seal provided with the end face sealing gasket.

In Figs. 1 and 2 an oil seal 15 is illustrated as being formed from an annular one-piece sealing member which includes an annular sealing lip portion 16 integrally joined with a body portion 17 by an intermediate portion 18. The sealing member is generally C-shaped in cross section and may be formed from any suitable resilient material such as rubber, synthetic rubber, leather, etc. The sealing lip portion 16 and body portion 17 are generally axially directed while the intermediate portion 18 extends in a radial direction interconnecting end portions of the sealing lip portion 16 and body portion 17.

Received about the inner and outer surfaces of the body portion 17 are ring-like shell members 19 and 20. The outer shell member 20 is generally J-shaped in cross section and is provided with integral leg portions 21 and 22, the innermost edge of the leg portion 22 being provided with an axially directed inturned flange 23. The leg portion 21 is axially directed and received about the outer surface of the body portion 17 while the leg portion 22 is radially directed and received about the outermost side surface of the intermediate portion 18. The inturned flange portion 23 extends inwardly in an axial direction a distance sufficient to reinforce the sealing member without interfering with the flexible movement of the sealing lip portion 16. The inner shell member 19 is formed from an axially directed portion 24 having integrally formed on each of its ends radially inwardly directed flanges 25 and 26. The flange portion 25 extends radially inwardly in engagement with the inner surface of the intermediate portion 18.

The free end of the body portion 17 of the sealing member has integrally formed therewith an annular, circumferentially continuous end face sealing gasket 27 which extends outwardly of the adjacent ends of the inner and outer shell members 19 and 20. The end face sealing gasket 27 is provided with radially directed, oppositely extending flange portions 28 and 29 which are backed-up and reinforced by the radially directed free edge of the leg portion 21 of the outer shell member 20 and the radially inwardly turned flange 26 of the inner shell member 19, respectively.

The end face sealing gasket 27 being formed integral with the free end portion of the body portion 17 of the sealing member and being further reinforced by adjacent ends of the inner and outer shell members 19 and 20 is arranged and designed for long-life, efficient sealing action. The inner and outer shell members 19 and 20 clamp the body portion 17 and the intermediate portion 18 of the sealing member to impart rigidity to the same thereby allowing the seal 15 to be readily mounted in a known manner about a rotatable shaft with the sealing lip portion 16 in sealing engagement therewith. The inner and outer shell members 19 and 20 may be bonded to the material of the sealing member or these shell members may be mounted relative to the body and intermediate portions 17 and 18 in non-bonded relation therewith and in such a manner as to impart the requisite rigidity to the sealing member to allow the same to function efficiently with respect to sealing action provided by the sealing lip portion 16 and the end face sealing portion 27. In mounting the shell members relative to the body and intermediate portions of the sealing member in non-bonded relation, the outer shell member 20 may be applied to the outer surfaces of the sealing member and the inner shell member provided with an outside diameter which is sufficiently greater than the inside diameter of the body portion 17 so as to compress or clamp the body and intermediate portions 17 and 18 against the inner surface of the outer shell member 20 when mounted with respect thereto. By compressing the material of the body portion 17 between the inner and outer shell members 19 and 20, the requisite rigidity is imparted to the seal 15 and the end face sealing portion 27 is held against undue flexing in its operative position. It has been found that the type of seal described is particularly adapted for use with non-bonded shell members and the assembly of the seal may be readily and easily accomplished on a low cost basis.

The sealing lip portion 16 is shaped in a known manner being provided with a radially inwardly directed shaft engaging lip 30 and further being provided along the inner surface thereof with a circumferentially continuous groove 31 which receives therein an endless lip constricting coil spring 32. The spring 32 acts in the known manner in maintaining an efficient sealing engagement between the annular lip portion 30 and a rotatable shaft while allowing the flexible sealing lip portion 16 to move in response to eccentric action of the shaft sealed thereby.

In Figs. 3 and 4, a different form of oil seal 33 is illustrated, this seal incorporating the principles of the present invention as described in connection with Figs. 1 and 2. The seal 33 is generally C-shaped in cross section and is provided with an inwardly positioned annular sealing lip portion 34 provided with an inwardly directed lip 35 and carrying a continuous groove 36 about the inner surface thereof which seats a coil spring 37. The sealing lip portion 34 is formed integral with an intermediate portion 38 which interconnects an end of the sealing lip portion with an end of a body portion 39. The body portion 39 and intermediate portion 38 are clamped between the inner and outer shell members 40 and 41, the inner shell member 40 being of the same construction as the inner shell member 19 previously described. The outer shell member 41 is similar to the outer shell member 20 previously described with the exception that the inwardly positioned, axially directed flange portion 23 is not present. As particularly shown in Fig. 3, the end portion of the sealing lip portion 34 integrally connected with the intermediate portion 38 is of reduced thickness to define a highly flexible neck 42 thereby providing the sealing lip portion 34 with a greater degree of flexibility.

The free end of the body portion 39 of the seal 33 is similarly provided with an end face sealing gasket 43, this particular gasket formation being provided with a single radially inwardly directed flange portion 44 which is backed-up or reinforced by a radially inwardly directed flange portion 45 of the inner shell member 40. As will be readily noted in comparing the end face sealing gasket 43 of Fig. 3 with the gasket 27 of Fig. 1, the gasket 43 is provided with but a single reinforced flange portion 44 while similarly being integrally formed with the body portion 39. As previously described in connection with the seal of Fig. 1, the inner and outer shell members 40 and 41 may be bonded to the material of the sealing member of the seal 33 or may be press-fitted to provide the body portion 39 with the requisite rigidity.

Figure 6:
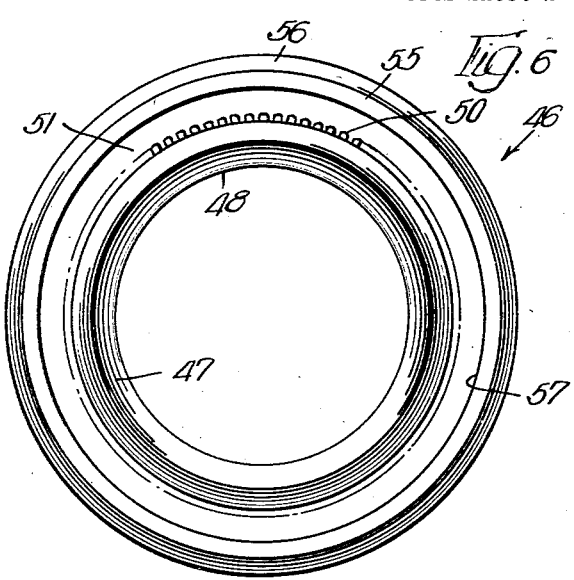
Fig. 6 is an end elevation of the seal of Fig. 5.

To further illustrate a different end face sealing gasket arrangement incorporating the principles of the present invention, a modified form of oil seal 46 is illustrated in Figs. 5 and 6. The sealing member of the seal 46 is of generally C-shaped cross section and is provided with an inwardly positioned sealing lip portion 47 having a lip 48 adapted for sealing engagement with a rotatable shaft and being provided with a groove 49 carried about the inner surface thereof in which a coil spring 50 is mounted. The sealing lip portion 47 is integrally connected with an intermediate radially directed portion 51 which at its outermost end is formed integral with an axially extending body portion 52. The inner surface of the body portion 52 has received thereabout an axially directed flat ring 53 which forms the inner shell member and which, if used in a non-bonded condition, clamps the body portion 52 against an outer shell member 54 which is generally L-shaped in cross section.

The free end of the body portion 52 is provided with an end face sealing gasket 55 which protrudes outwardly beyond the adjacent free ends of the inner and outer shell members 53 and 54. The outermost surface of the end face sealing gasket 55 is tapered in an outwardly direction to provide a circumferentially continuous bevelled surface 56 which defines a substantially V-shaped shoulder or flange reinforced or backed-up by the adjacent edge of the outer shell member 54. An inner flange portion 57 of the type previously described is reinforced by the adjacent edge of the inner ring or inner shell member 53 and the end face sealing gasket 55 is, consequently, rigidly supported for efficient sealing action.

Figure 7:
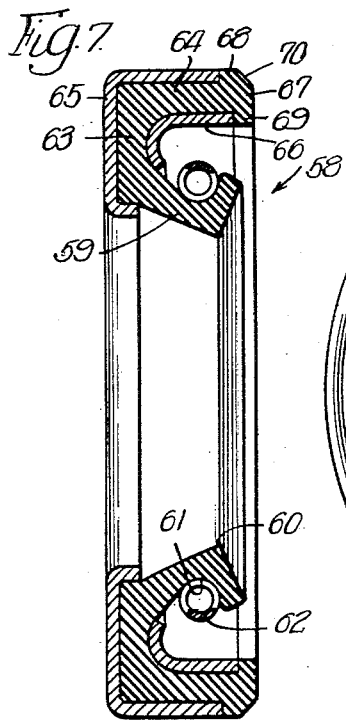
Fig. 7 is a vertical section of a further form of improved oil seal.
Figure 8:
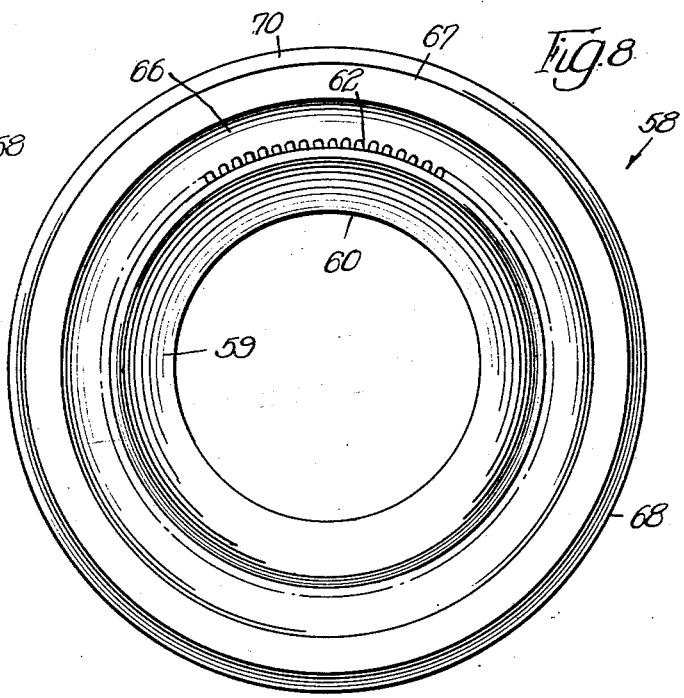
Fig. 8 is an end elevation of the seal of Fig. 7.

An oil seal 58 is shown in Figs. 7 and 8 which further illustrates a different shape of end face sealing gasket incorporating the principles of the present invention. The sealing member of resilient material of the oil seal 58 is again generally C-shaped in cross section and is provided with an inwardly positioned sealing lip portion 59 having a lip 60 for engagement with a shaft and provided along the inner surface thereof with a groove 61 which seats a coil spring 62. The sealing lip portion 59 is integrally formed with an intermediate portion 63 which is radially directed and integrally formed at its outermost end with an axially extending body portion 64. The outer surfaces of the intermediate portion 63 and body portion 64 are in engagement with an outer shell member 65 which is of the type previously described in connection with Figs. 1 and 2. An inner shell member 66 of generally J-shape cross section rigidly clamps the body portion 64 and the intermediate portion 63 against the outer shell member 65.

The free end of the body portion 64 has integrally formed therewith an outwardly extending end face sealing gasket 67 which is provided with flange portions 68 and 69. The flange portion 68 is axially thicker than the flange 69 and extends rearwardly into contact with the free edge of the outer shell member 65 to be reinforced by the same. A circumferentially continuous bevel 70 provides the outer surface of the gasket 67 with a slanted portion of a configuration similar to that described in connection with the seal 46 of Figs. 5 and 6. The innermost flange portion 69 is reinforced by the adjacent free edge of the inner shell member 66 for the purposes previously described.

The seal 71 of Figs. 9 and 10 is formed from a sealing member having a sealing lip portion 72 which is provided with inwardly directed, axially spaced sealing lips 73 and 74. The inner surface of the sealing lip portion 72 adjacent the lip 74 is provided with a groove 75 which receives therein a coil spring 76. Intermediate the lips 73 and 74, a radially directed intermediate portion 77 is integrally attached to the sealing lip portion 72. Outwardly of the sealing lip portion 72 is a body portion 78 integrally attached to the outermost end portion of the intermediate portion 77. The elements described combine with one another to form a sealing member of generally C-shape cross section and the outermost surfaces of the intermediate portion 77 and body portion 78 are confined by a generally L-shaped outer shell member 79. The inner surfaces of the intermediate portion 77 and body portion 78 are compressibly engaged by an inner shell member 80 of generally L-shape cross section which is concentrically positioned relative to the outer shell member 79. The free end of the body portion 78 has integrally formed therewith an end face sealing gasket 81 similar in design as the gasket 27 of the seal 15 of Figs. 1 and 2. The gasket 81 is provided with radial flange portions 82 which extend in inwardly and outwardly directions, each of which is reinforced by adjacent edges of the outer and inner shell members 79 and 80.

In Fig. 11, a seal 83 is illustrated mounted relative to a rotatable shaft 84 within a shaft housing 85. The seal 83 is similar in design as the seal 71 of Figs. 9 and 10 with the exception that a single sealing lip is provided on the sealing lip portion which is flexibly received about the shaft 84. Because of the similarity in construction, like reference numerals are used for like elements.

The shaft housing 85 is provided with a bore 86 through which the shaft 84 extends, the bore 86 being in communication with an enlarged bore 87 defining therewith an annular, radially directed shoulder or surface 88 against which the radial outer surface of the end face sealing gasket 81 is pressed in sealing engagement. The bore 87 is provided with a circumferentially continuous, radially inwardly opening groove 89 which has received therein a holding ring 90, the innermost edge portion of which engages the outer radial surface of the outer shell member 79 to hold the seal 83 in end face sealing engagement with the shoulder 88.

The various modified types of seals illustrated in the drawings are readily adapted for mounting within a shaft housing in the same manner as illustrated in Fig. 11 in connection with the seal 83. Each of the modified forms of seals are readily constructed and, as previously described particularly in connection with the seal 15 of Figs. 1 and 2, the inner and outer shell members may be bonded to the inner and outer contacted surfaces of the sealing member or may be force-fitted in non-bonded relation to compress the material of the body portion of the sealing member as well as the material of the intermediate portion of the sealing member to impart rigidity for mounting purposes to the oil seal.

The end face sealing gasket of each of the seals is readily adapted for establishing a moving frictional seal with a radially directed surface as well as a static seal with such a surface, each of the seals being adapted for either rotation with a shaft or for being held against rotation with a shaft sealed thereby. As will be particularly noted from the various designs of the end face sealing gaskets, these gaskets are readily adapted for shaping to allow the same to be placed in effective sealing engagement with different shapes of end face sealing surfaces. The radially directed flange portions of the end face sealing gaskets, either present in the form of a single flange or oppositely directed pairs of flanges, are adapted to provide efficient sealing action with a radial surface under seal by reason of being reinforced by adjacent edges of the concentrically located inner and outer shell members. Consequently, the shell members not only function to impart the requisite rigidity to the oil seal but further establish and maintain axially directed forces of compression with the end face sealing gasket to reinforce the same throughout thereby promoting efficient sealing action in both a radial and axial direction.

As previously described, the oil seals illustrated as incorporating the principles of the present invention are of uncomplicated design and construction while being capable of performing dual sealing functions. These seals, as a result, are economically manufacured and are readily adapted for varying uses.

Obviously many modifications and variations of the invention as hereinbefore set forth may be made without departing from the spirit and scope thereof, and therefore only such limitations should be imposed as are indicated in the appended claims.

I claim:

1. An oil seal including a sealing member formed from resilient material and provided with an annular sealing lip portion adapted to be received about a shaft in radially acting sealing engagement therewith, an annular axially extending body portion spaced outwardly of said lip portion and joined therewith through an integral radially directed intermediate portion, concentric rigid ring-like members forming a part of said seal and compressively encasing said body portion therebetween to fixedly mount and rigidify the same, and an end face sealing portion integral with an end of said body portion and extending axially outwardly of adjacent ends of said ring-like members and radially overlapping both of said ends for fixed axial backing thereby, said ring-like members by compressively encasing said body portion establishing and maintaining compressive forces which in an axial direction toward said end face sealing portion further back up the same throughout the effective surface area thereof.

2. An oil seal including a sealing member formed from resilient material and provided with an annular sealing lip portion adapted to be received about a shaft in radially acting sealing engagement therewith, an annular axially extending body portion spaced outwardly of said lip portion and joined therewith through an integral radially directed intermediate portion, concentric rigid ring-like members forming a part of said seal and encasing said body portion therebetween to fixedly mount and rigidify the same, said ring-like members including an outer shell received about the outer surface of said body portion and an inner shell received along the inner surface of said body portion co-extensive with said outer shell, said inner shell compressing said body portion between the same and said outer shell, and an end face sealing portion integral with an end of said body portion and extending axially outwardly of adjacent ends of said ring-like members, said end face sealing portion having radially oppositely extending flange portions covering adjacent end surfaces of said ring-like members for fixed axial backing thereby, said ring-like members by compressively encasing said body portion establishing and maintaining compressive forces which in an axial direction toward said end face sealing portion further back up the same throughout the effective surface area thereof.

3. An oil seal including an annular sealing member of generally C-shaped cross section, said sealing member being formed from an axially extending body portion spaced outwardly of an axially extending sealing lip portion which portions are integrally joined at adjacent ends by a radially extending portion, inner and outer shell members received in fixed engagement with the inner and outer surfaces of said body portion and imparting rigidity to said body portion, the free end of said body portion extending axially beyond adjacent ends of said shell members to provide an end face gasket sealing portion and being provided with oppositely directed radially expanded portions which overlap and are backed-up by one of the adjacent ends of said shell members, said inner shell member being of a diameter greater than that of the initially uncompressed inner axial surface of said body portion to expand said body portion against the inner surface of said outer shell member and by axially directed forces of compression established thereby rigidify the same centrally of said end face gasket sealing portion.

References Cited in the file of this patent

UNITED STATES PATENTS

| | | |
|---|---|---|
| 2,760,802 | Haley | Aug. 28, 1956 |

FOREIGN PATENTS

| | | |
|---|---|---|
| 479,743 | Great Britain | Feb. 10, 1938 |
| 556,441 | Great Britain | Oct. 5, 1943 |
| 702,590 | Germany | Feb. 11, 1941 |
| 866,585 | Germany | Mar. 5, 1953 |